US009741198B2

(12) United States Patent
Visser

(10) Patent No.: US 9,741,198 B2
(45) Date of Patent: Aug. 22, 2017

(54) GAMING DEVICE WITH SPECIAL SYMBOL

(71) Applicant: Aristocrat Technologies Australia Pty Limited, North Ryde (AU)

(72) Inventor: Antoon Christiaan Visser, Coogee (AU)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 77 days.

(21) Appl. No.: 14/833,937

(22) Filed: Aug. 24, 2015

(65) Prior Publication Data

US 2015/0363995 A1 Dec. 17, 2015

Related U.S. Application Data

(63) Continuation of application No. 13/724,190, filed on Dec. 21, 2012, now abandoned, which is a
(Continued)

(30) Foreign Application Priority Data

Aug. 27, 2007 (AU) ................................ 2007904586

(51) Int. Cl.
*A63F 9/24* (2006.01)
*A63F 13/00* (2014.01)
(Continued)

(52) U.S. Cl.
CPC .......... *G07F 17/3204* (2013.01); *G07F 17/32* (2013.01); *G07F 17/3244* (2013.01); *G07F 17/34* (2013.01)

(58) Field of Classification Search
CPC ............................ G07F 17/32; G07F 17/3267
See application file for complete search history.

(56) References Cited

U.S. PATENT DOCUMENTS 7,195,559 B2 3/2007 Gilmore et al.
2003/0064779 A1 4/2003 Suda
(Continued)

FOREIGN PATENT DOCUMENTS

AU 2008200536 8/2008

OTHER PUBLICATIONS

United States Patent and Trademark Office, "Non-Final Office Action," issued in connection with U.S. Appl. No. 12/198,541, mailed on Jul. 2, 2012, 21 pages.
(Continued)

*Primary Examiner* — Kevin Y Kim
(74) *Attorney, Agent, or Firm* — Armstrong Teasdale LLP

(57) ABSTRACT

A gaming machine that provides a game in which an array of symbol positions are populated with game symbols from a set of game symbols, the set of game symbols including ordinary game symbols and at least one special symbol, the gaming machine being adapted to award an award if a winning combination of game symbols is displayed, the gaming machine including a user interface in communication with a game controller, wherein the game controller is adapted to enhance the characteristics of at least one of the ordinary game symbols to create at least one enhanced symbol based upon the relative location of the ordinary game symbol to a special symbol.

29 Claims, 8 Drawing Sheets

Related U.S. Application Data continuation of application No. 12/198,541, filed on Aug. 26, 2008, now abandoned.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(56) References Cited

U.S. PATENT DOCUMENTS

| | | | | |
|---|---|---|---|---|
| 2005/0130733 | A1* | 6/2005 | Mierau | G07F 17/32 463/20 |
| 2006/0084492 | A1* | 4/2006 | Baerlocher | G07F 17/3213 463/20 |
| 2009/0191943 | A1 | 7/2009 | Visser | |
| 2013/0116034 | A1 | 5/2013 | Visser | |

OTHER PUBLICATIONS

United States Patent and Trademark Office, "Non-Final Office Action", issued in connection with U.S. Appl. No. 13/724,190, mailed on Aug. 5, 2014, 20 pages.

United States Patent and Trademark Office, "Final Office Action", issued in connection with U.S. Appl. No. 13/724,190, mailed on Feb. 25, 2015, 12 pages.

* cited by examiner

GAMING DEVICE WITH SPECIAL SYMBOL

CROSS-REFERENCE TO RELATED APPLICATIONS

The present application claims the benefit of priority as a continuation to U.S. patent application Ser. No. 13/724,190, filed on Dec. 21, 2012, entitled "GAMING DEVICE WITH SPECIAL SYMBOL," which claims priority to U.S. patent application Ser. No. 12/198,541, filed on Aug. 26, 2008, entitled "GAMING DEVICE WITH SPECIAL SYMBOL," and Australian Provisional Patent Application No. 2007904586, filed on Aug. 27, 2007, entitled "Gaming Device with Special Symbol", each of which is herein incorporated by reference in its entirety.

FIELD OF THE INVENTION

The presently described technology generally relates to gaming machines and methods of gaming. A particular embodiment of the presently described technology relates to a gaming device with a special symbol.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

SUMMARY OF THE INVENTION

According to a first aspect, the present invention broadly resides in a gaming machine that provides a game in which an array of symbol positions are populated with game symbols from a set of game symbols, the gaming machine being adapted to award an award if a winning combination of game symbols is displayed, the gaming machine including a user interface in communication with a game controller, the set of game symbols includes ordinary game symbols and at least one special symbol, wherein the game controller is adapted to enhance the characteristics of at least one of the ordinary game symbols to create at least one enhanced symbol based upon the relative location of the ordinary game symbol to a special symbol.

Preferably, the enhanced symbol is created by assigning a multiplier value to an ordinary game symbol, the multiplier value applicable to an award associated with a winning combination which includes the enhanced symbol to which the multiplier has been assigned.

Alternatively, the enhanced symbol may be created by making an ordinary game symbol substitutable for one or more ordinary game symbols for the purposes of determining a winning combination.

Preferably, the game controller is adapted to enhance the characteristics of at least one of the ordinary game symbols only when the special symbol has been activated in response to an activation event.

The game controller may also be adapted to enhance the characteristics of the special symbol itself.

Optionally, on activation of a special symbol the game controller is adapted to enhance the characteristics of a plurality of ordinary game symbols to create a plurality of enhanced symbols.

If an enhanced ordinary symbol is assigned a multiplier value, the multiplier value assigned to the enhanced symbol may be dependent on the proximity of the enhanced symbol to the special symbol. The value of the multiplier may decrease the further an enhanced symbol is away from the special symbol.

Alternatively, if an enhanced symbol is substitutable for one or more ordinary game symbols the number or type of ordinary game symbols the enhanced game symbol is substitutable for may be related to the proximity of the enhanced symbol to the activated symbol. Preferably the closer the enhanced ordinary game symbol is to the special symbol the greater the number of ordinary symbols the enhanced symbol will be substitutable for.

Conveniently, the gaming machine includes an indicator for indicating the activation of both the special symbol and the existence and/or location of any enhanced symbols.

Optionally different activation events will result in different characteristics being assigned to the special symbol and/or the at least one enhanced symbol.

Optionally the special symbol may substitute as one or more ordinary symbols for the determination of a winning combination whether the special symbol has been activated by an activation event or not.

Preferably a special symbol activated by an activation event will remain activated until the occurrence of a deactivation event.

The activation event may include an ante-bet feature, in which a player is given the option of purchasing the activated special symbol.

According to a second aspect, the invention broadly resides in a method for use with a gaming machine that is arranged to select symbols, present the selected symbols on a display and award an award if a winning outcome occurs, wherein the set of game symbols includes ordinary game symbols and at least one special symbol, the method including enhancing the characteristics of at least one of the ordinary game symbols to create at least one enhanced symbol based upon the relative location of the ordinary game symbol to a special symbol.

Preferably, the enhanced symbol is created by assigning a multiplier value to an ordinary game symbol, the multiplier value applicable to an award associated with a winning combination which includes the enhanced symbol to which the multiplier has been assigned.

Alternatively, the enhanced symbol may be created by making an ordinary game symbol substitutable for one or more ordinary game symbols for the purposes of determining a winning combination.

According to a third aspect, the invention broadly resides in a gaming system including a plurality of linked gaming machines, each gaming machine providing a game in which a plurality of symbols are selected and presented on a display and if a winning combination occurs, the gaming machine awards an award, wherein the plurality of game symbols includes ordinary game symbols and at least one special symbol, wherein each gaming machine is adapted to enhance the characteristics of at least one of the ordinary game symbols to create at least one enhanced symbol based upon the relative location of the ordinary game symbol to a special symbol.

Preferably, the enhanced symbol is created by assigning a multiplier value to an ordinary game symbol, the multiplier value applicable to an award associated with a winning combination which includes the enhanced symbol to which the multiplier has been assigned.

Alternatively, the enhanced symbol may be created by making an ordinary game symbol substitutable for one or more ordinary game symbols for the purposes of determining a winning combination.

According to a fourth aspect, the invention broadly resides in a gaming system including at least one gaming machine, each gaming machine having a user interface and providing a spinning reel game in which symbols are spun up on a plurality of reels to form at least one outcome, and if a winning combination occurs, the gaming machine awards an award, the symbols including ordinary game symbols and at least one special symbol, the gaming system including an electronic processing system including at least one game controller that determines which one of a plurality of different wager options has been selected using the user interface for a current game play of the spinning reel game and in response to the selection of at least one of the wager options, wherein the game controller is adapted to enhance the characteristics of at least one of the ordinary game symbols to create at least one enhanced symbol based upon the relative location of the ordinary game symbol to a special symbol.

Preferably, the enhanced symbol is created by assigning a multiplier value to an ordinary game symbol, the multiplier value applicable to an award associated with a winning combination which includes the enhanced symbol to which the multiplier has been assigned.

Alternatively, the enhanced symbol may be created by making an ordinary game symbol substitutable for one or more ordinary game symbols for the purposes of determining a winning combination.

According to a fifth aspect, the invention broadly resides in instructions executable by a game controller to implement the method as described in the immediately preceding paragraphs and to such instructions when stored in a storage medium readable by the game controller.

It will be understood that by the term "ordinary symbol" is meant all symbols which are not special symbols of the type defined.

Further aspects of the present invention and further embodiments of the aspects described in the preceding paragraphs will become apparent from the following description, given by way of example and with reference to the accompanying drawings.

Figure 1:
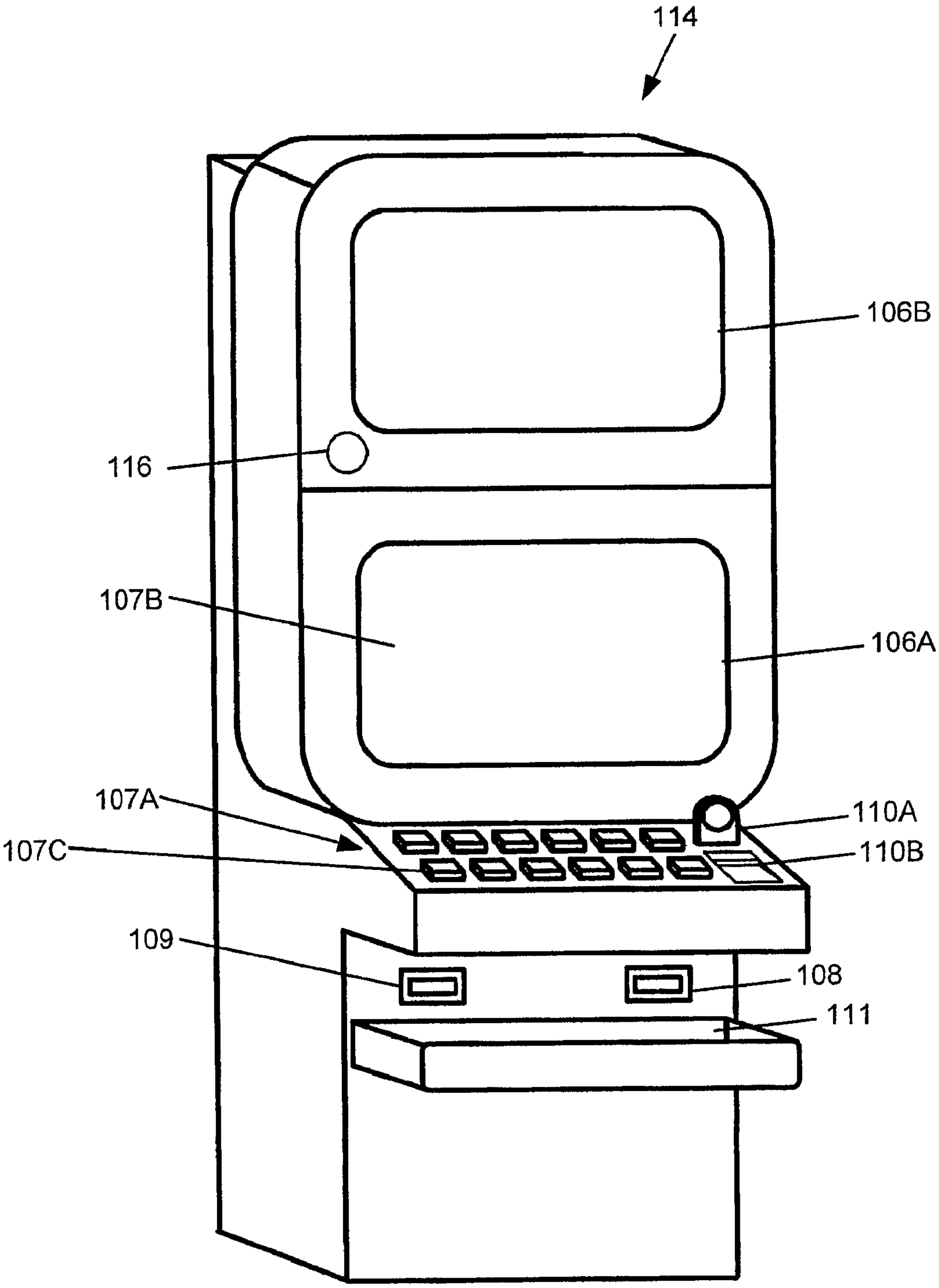
FIG. 1: shows diagrammatically, a view of a gaming console suitable for implementing certain embodiments of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE EMBODIMENTS

In FIG. 1 of the accompanying drawings, one example of a gaming console that is suitable to implement certain embodiments of the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
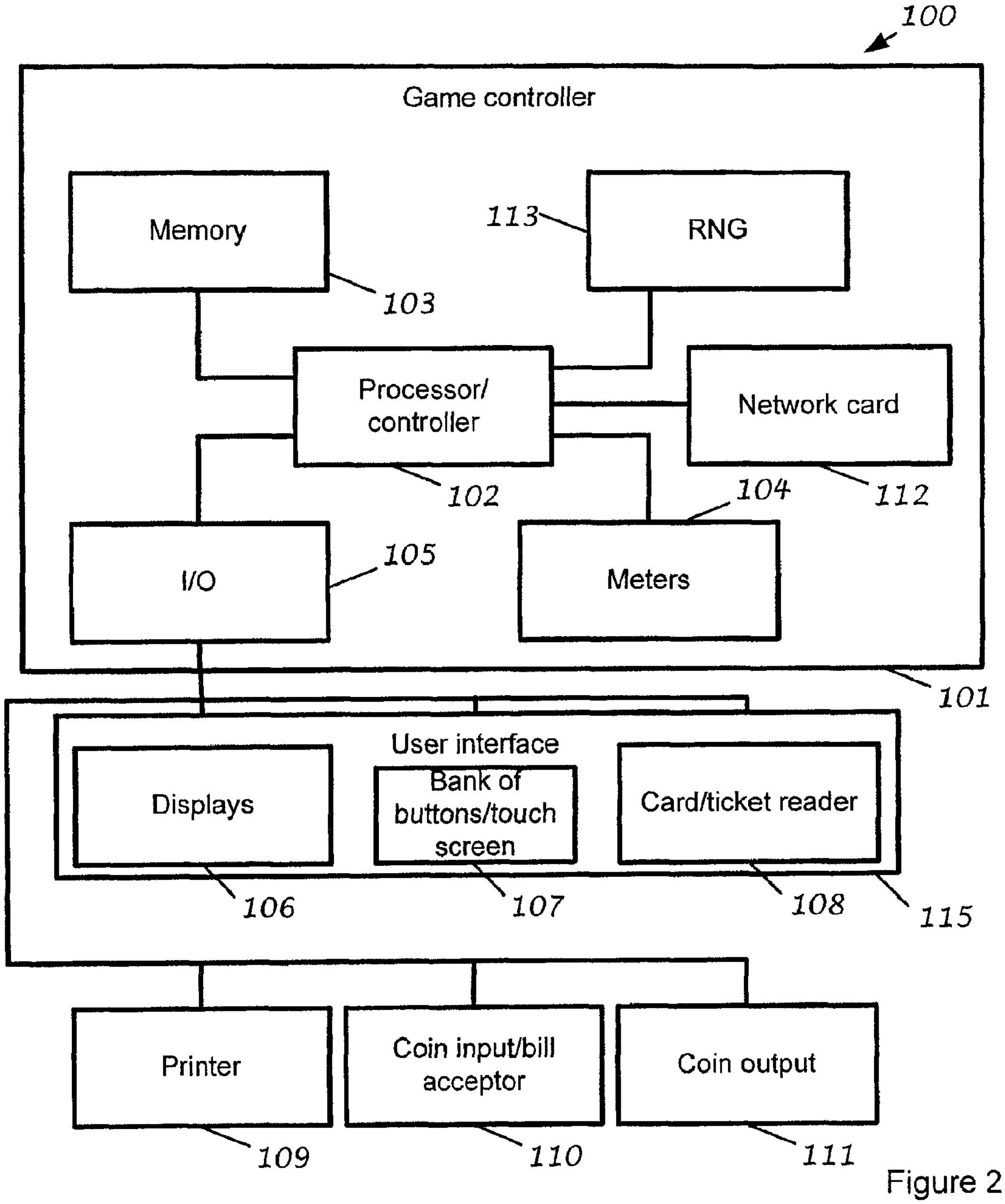
FIG. 2: shows a block diagram of gaming machine suitable for implementing certain embodiments of the present invention.

FIG. 2 shows a block diagram of a gaming machine, generally referenced by arrow 100, suitable for implementing certain embodiments of the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement certain embodiments of the present invention will be stored in the memory 103.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted based on the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
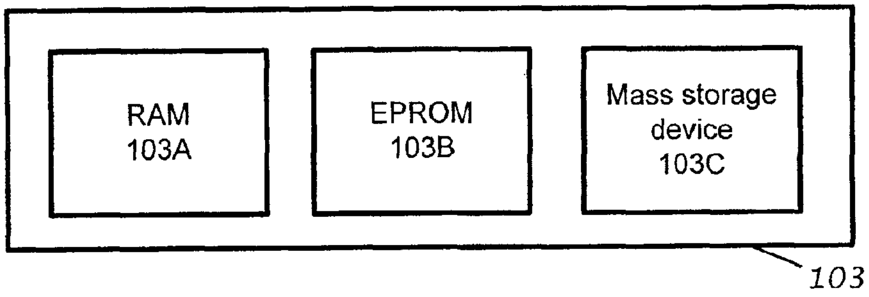
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 3A:
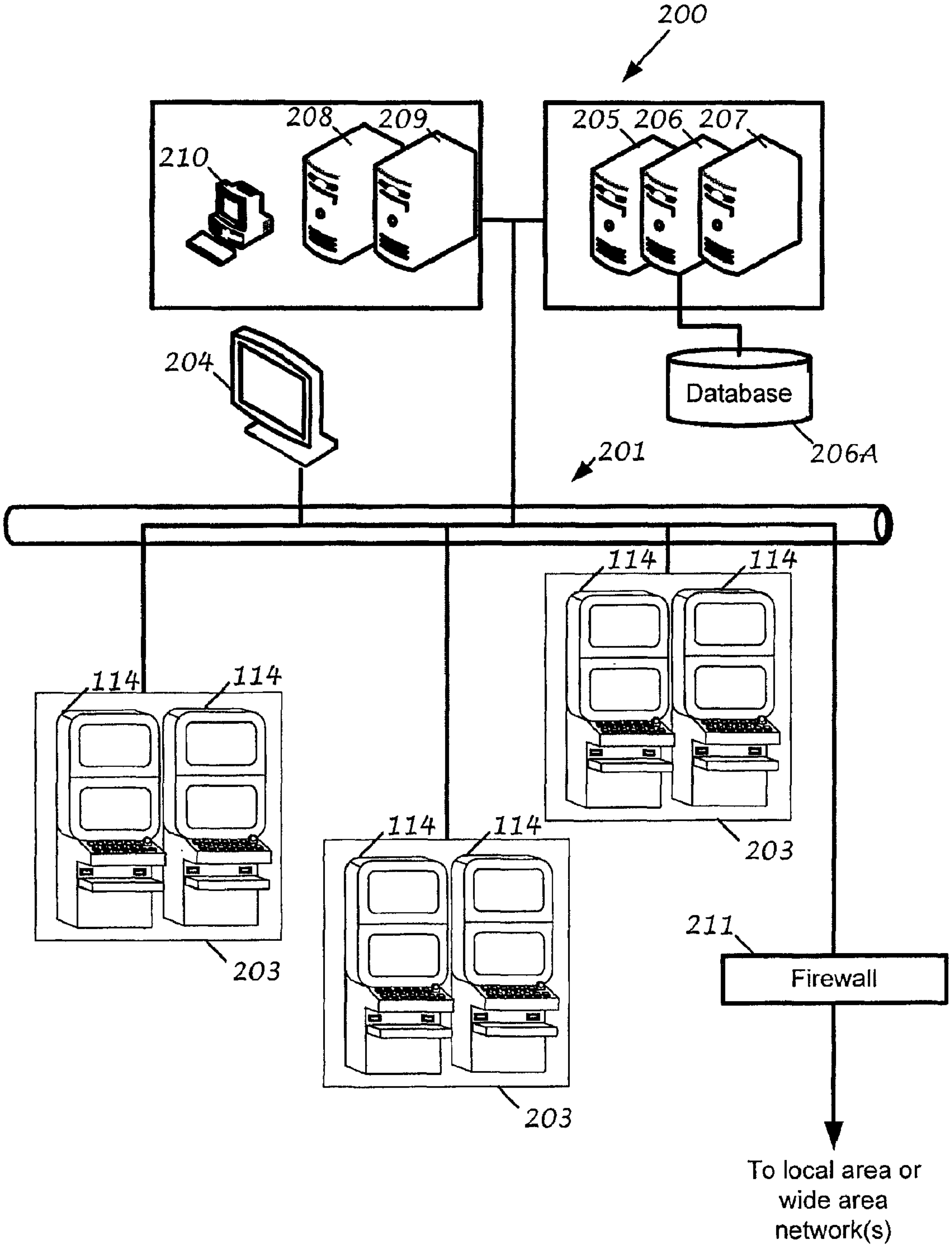
FIG. 3A: shows diagrammatically, a network gaming system suitable for implementing certain embodiments of the present invention
Figure 4:
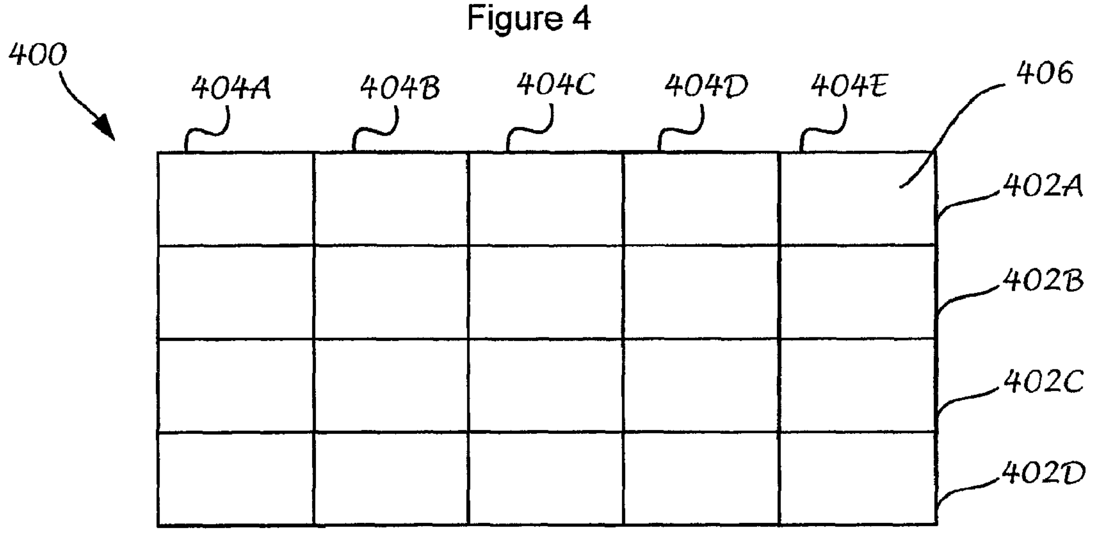
FIG. 4: shows an array of symbol positions for display of game symbols in accordance with an embodiment of the invention.

FIG. 3A shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming consoles 114 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming consoles 114, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

FIG. 4 depicts an example array 400 of symbol positions 406 which, during game play in accordance with an embodiment of the present invention, are displayed by the game controller 101 in one or both of displays 106A or 106B. In the illustrated embodiment the array 400 is comprised of four rows 402A to 402D and five columns 404A to 404E. This 5×4 array provides a total of 20 possible symbol positions 406. It will, of course, be appreciated that while the preferred embodiment of the invention is described with reference to this 5×4 array of symbol positions, different sized arrays or different arrangements of symbol positions may be used, such as a 5×3 array and a 5×5 array.

As discussed in more detail below, when the game is played by the user each symbol position 406 in the array of symbol positions 400 is populated with a game symbol from a set of game symbols. The set of game symbols includes both ordinary game symbols and at least one special game symbol. As with conventional gaming machines, if the population of symbol positions 406 with game symbols results in the occurrence of a winning combination, the game controller awards a prize. Without limitation, a winning combination may for example be any predetermined arrangement of one or more specific game symbols, e.g. the occurrence of three of the same game symbols adjacent each other in a straight line.

Spinning Reel Game

Figure 5:
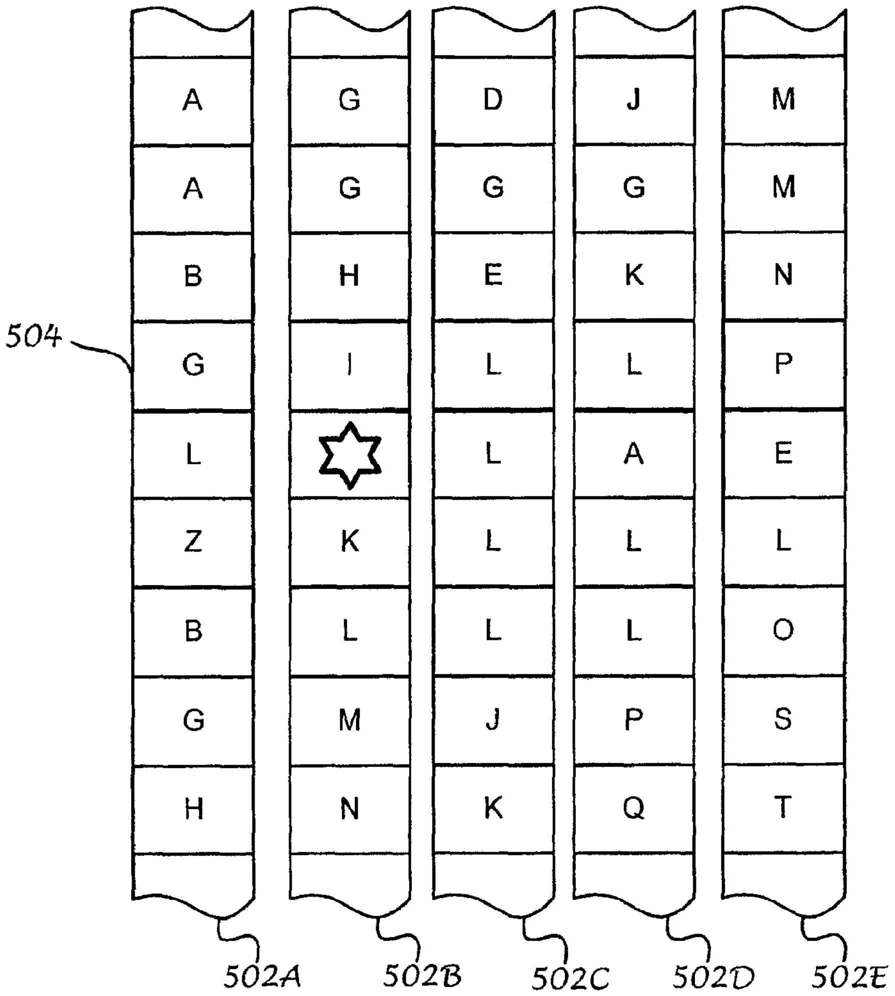
FIG. 5: shows a series of reels for use with an embodiment of the invention.

In one embodiment, the game is a reel type game where the set of game symbols is defined by five virtual reel strips 502A to 502E (as shown in FIG. 5), each reel strip including a plurality of sequential game symbols 504. Each of these game reels 502A to 502E correspond respectively to the five columns 404A to 404E in the array of symbol positions. When the game is played the game controller 101 causes the "reels" carrying the reel strips 502A to 502E to be "spun" before coming to a rest, at which point each of the symbol positions 406 in the array of symbol positions 400 is populated by a game symbol from one of the reels 502A to 502E. In some embodiments virtual reels 502A to 502E may be replaced by physical reels rotated by a stepper motor under the control of the game controller 101.

Figure 6:
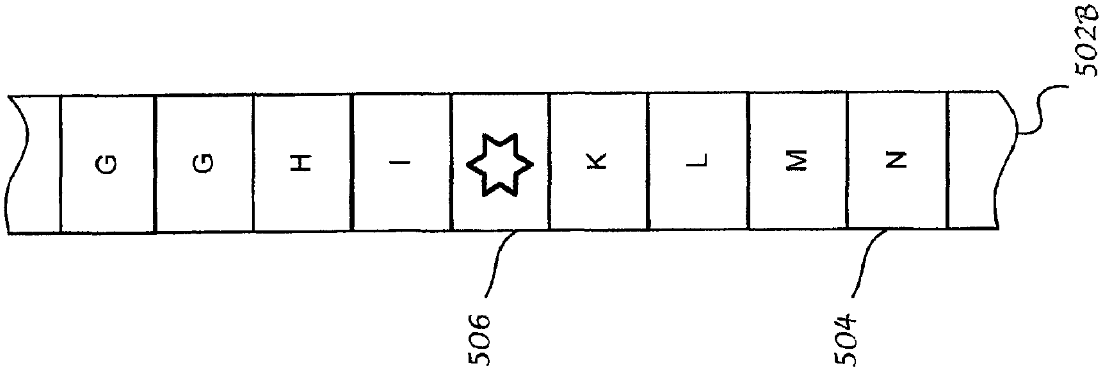
FIG. 6: shows a reel including a deactivated special symbol in accordance with an embodiment of the invention.

Referring to FIG. 6, a single reel strip 502C is shown. In addition to ordinary game symbols 504 (designated by letters), the set of game symbols (of which the symbols appearing on reel 502C are a subset) also includes a special symbol 506. In the preferred embodiment the game controller 101 is configured to enable a special symbol 506 to be a wild symbol substituted for any ordinary game symbol 504 in order to make a winning combination. For example, if a winning combination is normally three "L" symbols adjacent each other in a row ("L" being an ordinary game symbol), two "L" symbols in a row with a special symbol 506 will satisfy the criteria for that winning combination (the special symbol 506 in this instance being interpreted by the game controller as an additional "L" symbol).

In addition to being substitutable for any ordinary game symbol 504, a special symbol 506 may be activated by the game controller 101 (as discussed further below) in which case the controller 101 is configured to implement predetermined enhancement and proximity rules associated with the special symbol 506. In this embodiment the enhancement rules enhance the characteristics of ordinary game symbols by assigning multiplier values to ordinary game symbols, however as discussed below alternative enhancement rules may be implemented.

Figure 7:
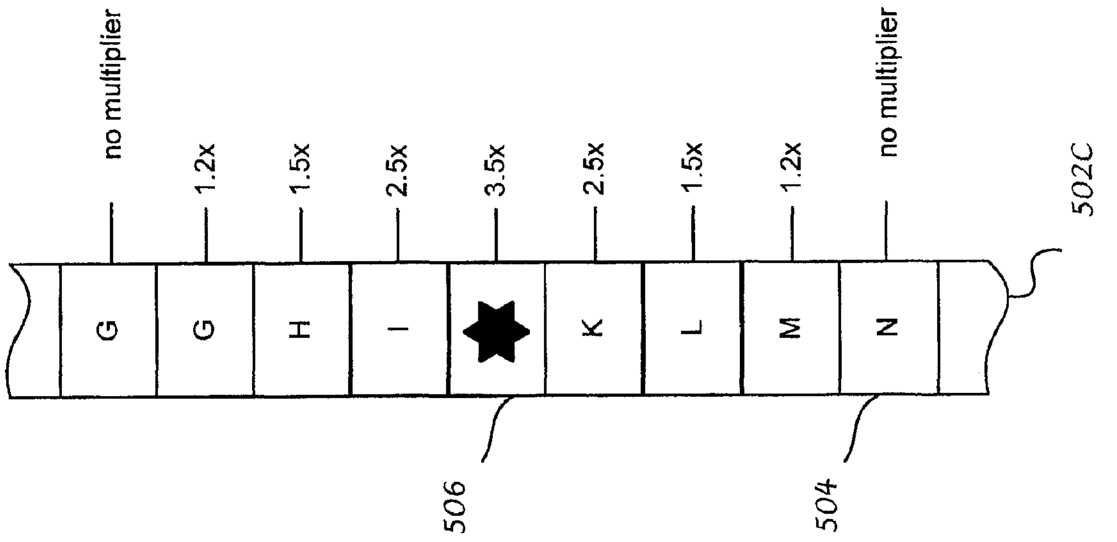
FIG. 7: shows the reel of FIG. 6 with the special symbol activated.

As shown in FIG. 7, when the special symbol 506 is activated the enhancement and proximity rules associated with the special symbol 506 cause the controller 101 to assign a multiplier value (in this case 3.5×) to the special symbol. In addition to the special symbol 506 itself being assigned a multiplier, a number of the additional ordinary game symbols 504 on the same reel as the special symbol 506 are also assigned multiplier values depending on the proximity of the ordinary symbol 504 to the special symbol 506. These multipliers can be seen from FIG. 7, in which

- each of the ordinary game symbols 504 adjacent special symbol 506 (i.e. symbols "I" and "K") are turned into enhanced symbols by assigning a multiplier value of 2.5×;
- each of the ordinary game symbols separated from the special symbol 506 by one intervening game symbol (i.e. symbols "H" and "L", separated from special symbol 506 by symbols "I" and "K" respectively) are turned into enhanced symbols by assigning a multiplier value of 1.5×; and
- each of the ordinary game symbols separated from the special symbol 506 by two intervening symbols (i.e. symbols "G" and "M", separated from special symbol 506 by symbols "H" and "I", and "K" and "L" respectively) are turned into enhanced symbols by assigning a multiplier of value 1.2×.

In an embodiment, ordinary symbols which are separated from special symbol 506 by more than two ordinary game symbols 504 are not assigned a multiplier and therefore not turned into enhanced symbols.

It will, of course, be appreciated that the enhancement rules may result in different multipliers being assigned, and different proximity rules may be prescribed. In this embodiment the enhancement and proximity rules determine the degree of multiplication applied to the special symbol and proximate ordinary symbols, as well as the proximity criteria for an ordinary symbol to be effected by the special symbol. For example, the enhancement and proximity rules may dictate that all affected symbols (i.e. the special symbol itself and ordinary symbols satisfying the proximity criteria) are assigned a 2.0× multiplier, and that only the special symbol and the two symbols separated from the special symbol by an intervening ordinary symbol are assigned that multiplier. Alternatively, the enhancement and proximity rules may dictate that the special symbol itself does not get assigned a multiplier but the symbols immediately adjacent the special symbol on either side are assigned a multiplier of 3.0×. Further examples of different enhancement and proximity rules are discussed below.

Figure 8A:
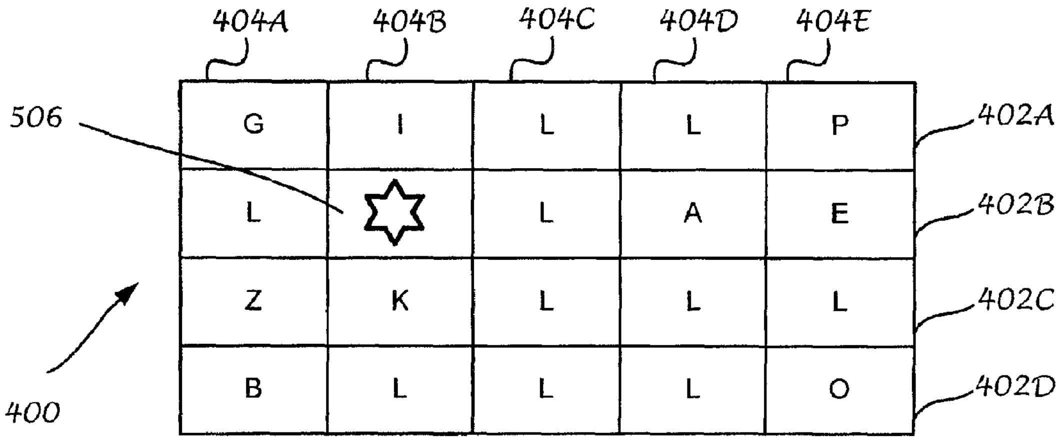
FIG. 8A: shows the array of symbol positions of FIG. 4 as populated by the reels depicted in FIG. 5 with the special symbol deactivated.
Figure 8B:
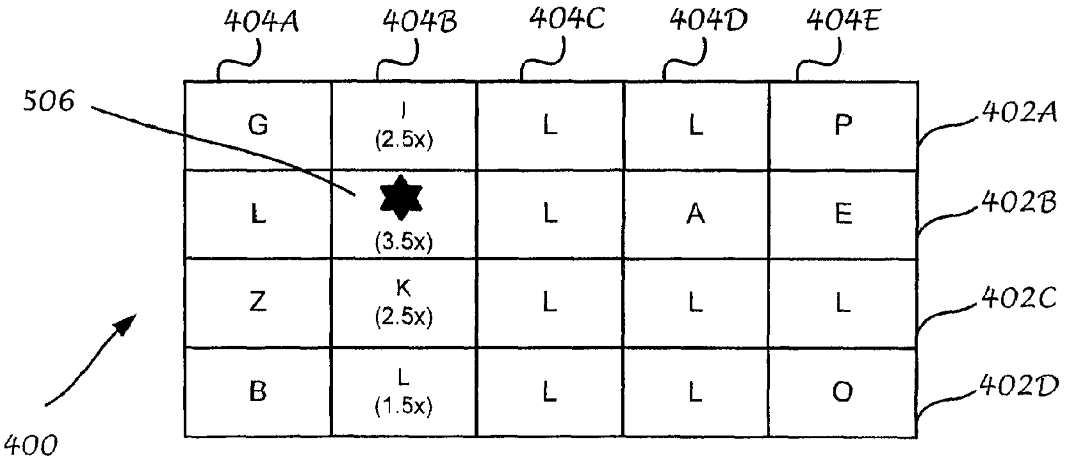
FIG. 8B: shows the array of symbol positions of FIG. 4 as populated by the reels depicted in FIG. 5 with the special symbol activated.

The effect of the multipliers assigned to the special symbol 506 the enhanced symbols (i.e. those ordinary symbols 504 sufficiently proximate to the special symbol 506) is to multiply the winnings associated with any winning combination that includes the special symbol or an enhanced symbol. By way of illustration, FIGS. 8A and 8B provided show the same set of game symbols displayed on array 400 (including a subset of the symbols of reel 502C as shown in FIGS. 6 and 7). In FIG. 8A the special symbol 506 has not been activated and in FIG. 8B the special symbol 506 has been activated. If, for example, the game controller 101 were configured to award (under ordinary circumstances) the combination of three "L" symbols in a row 100 credits, the winning combinations in FIGS. 8A and 8B would be as follows:

- Row 402A: no occurrence of three "L" symbols in a row. No award.
- Row 402B: two "L" symbols and special symbol 506 in a row (columns 404A, 404B, and 404C). Special symbol is interpreted as an "L" in order to make the winning combination of three "L" symbols:
  - if special symbol has not been activated (FIG. 8A), award is 100 credits.
  - if special symbol has been activated (FIG. 8B), award is 350 credits (3.5× multiplier operative).
- Row 402C: three "L" symbols in a row (columns 404C, 404D, 404E). Award is 100 credits regardless of whether special symbol is activated as winning combination does not include the special symbol or an enhanced symbol.
- Row 402D: three "L" symbols in a row (columns 404B, 404C and 404D):
  - if special symbol has not been activated (FIG. 8A), award is 100 credits.

if special symbol has been activated, award is 150 credits (due to inclusion of enhanced "L" symbol in column 404B which has operative 1.5× multiplier due to proximity to special symbol).

It should also be noted that while in the present embodiment those ordinary symbols 504 within the designated proximity to the special symbol are assigned a multiplier they are not treated as special symbols otherwise and as such cannot substitute for other symbols. For example while the enhanced "I" symbol in row 402A of FIG. 8B is assigned a multiplier of 2.5× it remains an "I" symbol and cannot form a winning combination with the two "L" symbols in columns 404C and 404D. In alternative embodiments (discussed below), however, enhanced symbols may be substitutable for additional ordinary game symbols.

Figure 9:
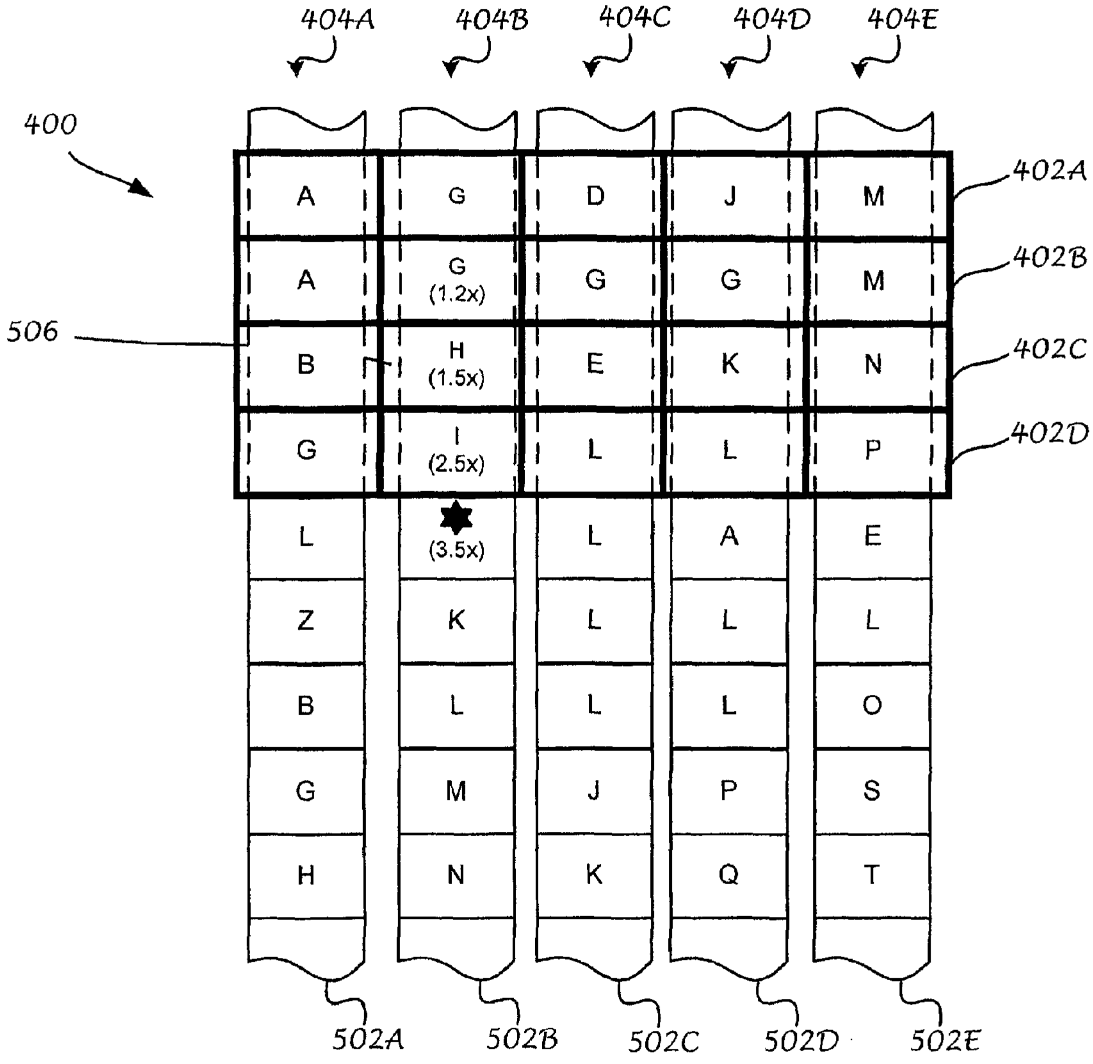
FIG. 9: shows the array of symbol positions of FIG. 4 populated by different symbols of the reels depicted in FIG. 5 with the special symbol activated.

Referring now to FIG. 9, the array of symbols 400 is depicted with reels 502A to 502E populating the symbol positions 406 with game symbols 504. From this figure an additional possible effect of an activated special symbol 506 is illustrated. As described above, once a special symbol 506 has been activated other ordinary symbols which are on the same reel 502B as the special symbol 506 and sufficiently proximate to that special symbol 506 are assigned multiplier values (i.e. turned into enhanced symbols). If desired the game controller 101 can be configured to recognise those multiplier values even if the special symbol 506 does not itself end up being displayed in one of the symbol positions 406 of the symbol array 400.

As can be seen in FIG. 9, the special symbol 506 on reel 502B (which in this example has been activated) has not made it onto the array of symbol positions 400, however the three enhanced symbols above the special symbol 506 (which are sufficiently proximate to have been assigned a multiplier) are displayed on the array of symbol positions 400 (at column 404B, rows 402B, 402C and 402D respectively). Presuming that three "G" symbols in a line is a winning combination worth (in ordinary game play) 100 credits, the three "G" symbols occurring in a line along row 402B will in this instance be awarded 120 credits due to the inclusion of the enhanced "G" symbol from reel 502B which has been assigned a multiplier of 1.2×.

As will be appreciated not only does this allow a player of the game to take receive an award which results from the special symbol 506 despite that special symbol itself not appearing on the array of symbol positions 400, it also alerts the player to the fact that they almost received the special symbol itself which may have the effect of encouraging further play of the game.

It is also possible for more than one reel 502A to 502E to be provided with a special symbol 506, and/or that each reel 502A to 502E may be provided with multiple special symbols. If multiple reels are provided with special symbols it may be possible to arrange those special symbols such that winning combinations including several special symbols (or several enhanced symbols with assigned bonuses due to their proximity to a special symbol) are achievable. Where a winning combination includes multiple special symbols and/or enhanced symbols, the overlapping bonuses may be dealt with, for example, by adding the bonuses, by multiplying the bonuses, by applying only the bonus that is most advantageous to the player.

Alternative Game Forms

While the features of the special symbol 506 above have been described in relation to a spinning reel type game, it will of course be appreciated that in alternative embodiments of the invention the set of game symbols need not be associated with reels (virtual or otherwise), and each individual symbol position 406 in the array of symbol positions 400 may be populated with a symbol from the set of game symbols independently of each other symbol position 406.

In this case reels (virtual or physical) need not be used, and therefore instead of "ordinary" game symbols being assigned multipliers based upon their proximity to an activated special symbol on the same reel, assignment of multiplier values takes place after the game controller 101 has determined which game symbols will be placed in which symbol positions 406 in the array 400.

Once final symbol placement in the array 400 has been determined by the game controller 101 the enhancement of characteristics of ordinary game symbols to change them into enhanced symbols (in the event that a special symbol has been activated) can be made on the same basis as above however with reference to symbol positions in the array 400 rather than on a reel. For example, if an activated special symbol were to be displayed in the symbol position 406 at the intersection of column 404C and row 402C, then:

the symbol at the intersection of column 404C and row 402B (i.e. one symbol above the special symbol) would be changed into a enhanced symbol by assigning a multiplier of 2.5×, the symbol at the intersection of column 404C and row 402D (i.e. one symbol below the special symbol) would be changed into a enhanced symbol by assigning a multiplier of 2.5×, the symbol at the intersection of column 404C and row 402A (i.e. two symbols above the special symbol and separated from the special symbol by one ordinary symbol) would be changed into an enhanced symbol by assigning a multiplier of 1.5×.

Alternative Enhancement and Proximity Rules

In the embodiment described above the enhancement rules result in the association of multiplier values to an activated special symbol and those "ordinary" symbols sufficiently proximate to the special symbol. It will, of course, be appreciated that different enhancement and proximity rules may be implemented.

By way of example, instead of (or in addition to) assigning a numeric multiplier to the special symbol and enhanced symbols the game controller 101 may enhance the characteristics of ordinary symbols to create enhanced symbols by allowing those symbols sufficiently proximate to the special symbol to substitute as other ordinary game symbols. For example, when the special symbol is activated:

the special symbol itself may substitute as any game symbol for the purposes of determining a winning a combination (as described above);

the two symbols immediately above and below the activated special symbol may be changed into enhanced symbols by allowing them to be substitutable for a subset of the ordinary game symbols for the purposes of determining a winning combination (e.g. if the game symbols were playing card symbols the two symbols immediately adjacent a special symbols may be configured by the game controller 101 to be substitutable for the symbols 'Ace', 'King', 'Queen', 'Jack', 'Ten'; and the two symbols separated from the special symbol by one intervening game symbol may be changed into enhanced symbols by allowing them to substitutable for a smaller and/or different subset of ordinary game symbols for the purposes of determining a winning combination (e.g. a smaller subset of symbols consisting of 'Queen', 'Jack' and 'Ten' only, or a different subset of symbols consisting of 'nine', 'eight', 'seven', 'six', and 'five')

In relation to the proximity rules, it is, of course, possible to alter these as desired. For example, while the proximity rules in the embodiment described above are based on the vertical proximity of ordinary symbols to a special symbol (i.e. above and below the symbol on the same reel or array column) the proximity rules may dictate that the characteristics of varying combinations of symbols in different directions (up, down, left, right and combinations thereof) are enhanced. The proximity rules may, for example, provide that the ordinary symbols which are turned into enhanced symbols are:

- one or more symbols above the special symbol
- one or more symbols below the special symbol
- one or more symbols to the left of the special symbol
- one or more symbols to the right of the special symbol
- one or more symbols to diagonally left and above the special symbol
- one or more symbols to diagonally right and above the special symbol
- one or more symbols to diagonally left and below the special symbol
- one or more symbols to diagonally right and below the special symbol
- any combination of the above.

Alternatively (or additionally), the game controller 101 may be configured to change the enhancement and/or proximity rules on the basis of sequential games played. For example:

- for the first game played the game controller 101 may assign the special symbol a multiplier value of 3.0×, and turn each symbol immediately above and below the special symbol into an enhanced symbol by assigning a multiplier value of 2.5× (as discussed in the embodiment above);
- in the second game (consecutive with the first game) the game controller 101 may assign the special symbol a multiplier value of 5.0×, and turn each symbol immediately above and below the special symbol into an enhanced symbol by assigning a multiplier value of 3.0×;
- in the third game (consecutive with the second game) the game controller 101 may assign the special symbol a multiplier value of 3.0×, and turn each symbol immediately above and below the special symbol into an enhanced symbol by assigning a multiplier value of 2.0×;
- in the fourth game (consecutive with the third game) the game controller 101 may assign the special symbol a multiplier value of 4.0×, and turn each symbol immediately above and below the special symbol into an enhanced symbol by assigning a multiplier value of 3.0×;

As will be appreciated, there are a number of different enhancement rules and proximity rules that may be implemented without departing from the scope of the invention.

Special Symbol Activation and Deactivation

As will be appreciated from the above, the game controller 101 may be configured such that the existence of special symbols provide a player of the game with an advantage whether activated or not.

When not activated the special symbol is advantageous in that it is interpreted by the game controller 101 as any ordinary symbol and therefore increases the chance of a winning combination occurring.

When the special symbol is activated the additional benefit of the enhancement and proximity rules associated with that special symbol are implemented by the game controller 101.

While the game controller 101 may be configured such that the special symbol is permanently activated, activation of the special symbol is preferably contingent on an activation event. For example, activation of a special symbol may be the result of any one or more of the following non-exhaustive list of activation events or trigger conditions:

- the placement of a specific wager option selected by a user of the game;
- the number of game credits exceeds a predetermined amount;
- the wager placed by a player exceeds a predetermined amount;
- the occurrence of one or more specific winning combinations;
- a particular outcome of a bonus game offered to the player by the game controller 101;
- the same player having played a predetermined number of consecutive games on the game machine;
- the same player having purchased a predetermined number of credits on the game machine;
- the passing of a predetermined period of time
- as an ante-bet feature where the player may purchase activation of a special symbol (e.g. by activation of ante-bet button 107C)
- random activation by the game controller 101.

Once an activation event has occurred, the game controller is configured 101 to maintain the special symbol in an activated state until a deactivation event occurs to deactivate the special symbol. Deactivation of the special symbol may be the result of any one or more of the following non-exhaustive list of deactivation events:

- no more game credits remain;
- the remaining game credits fall below a predetermined amount;
- the wager placed by the player falls below a predetermined amount;
- a predetermined number of game plays since activation of the special symbol is reached;
- a predetermined number winning events making use of the special symbol and/or ordinary symbols which have been assigned multipliers is reached;
- the winning of a predetermined amount of credits since activation of the special symbol;
- the passing of a predetermined time since activation of the special symbol In addition to activation and deactivation events changing the characteristics of ordinary symbols sufficiently proximate to a special symbol to turn them into enhanced symbols, occurrence of an activation or deactivation event also causes the game controller 101 to alter the appearance of the special symbol and enhanced symbols so as to alert the user to the modified properties of those symbols.

For example, when an activation event occurs the game controller 101 is configured to alter the appearance of the activated special symbol and enhanced symbols, for example to provide those symbols with differently coloured frames and/or backgrounds so the user can tell that the special symbol has been activated and which game symbols have been changed to enhanced symbols as a result of that activation. The game controller 101 may also be configured to overlay a description of the enhanced characteristic of an enhanced symbol (e.g. the multiplier value or the symbols the enhanced symbol may substitute for) onto the enhanced symbols to alert the player to this. Typically, a 'gradient' effect is achieved by the colour of the activated special or wild symbol flowing outwards across all of the proximate enhanced symbols that have been affected. The colour may vary from dark to light/dull to bright depending on the enhanced characteristics.

Alternatively or additionally, the gaming machine may be provided with a dedicated indicator 116 controlled by the game controller 101 for alerting a player to the activation and/or deactivation of a special symbol. The indicator 116 may, for example, be a light, and the game controller 101 may cause indicator 116 to flash when a special symbol is active and to remain off when no special symbol is active.

When a deactivation event occurs the game controller 101 is configured to return the special symbol and enhanced symbols back to their original appearance so that the player knows the special symbol has not been activated.

The game controller may be further configured such that different activation events result in different enhancement and proximity rules associated with the special symbol being implemented by the game controller 101. As a simple example, one activation event may cause multipliers of x to be assigned to the special symbol and enhanced symbols, while a different activation event may cause multipliers of 2× to be assigned to the special symbol and enhanced symbols.

The game controller may also be configured to "stack" the multipliers associated with a special symbol where an activation event occurs at a time where the special symbol is already activated. For example, on the first occurrence of an activation event the game controller 101 may be configured to activate the enhancement and proximity rules associated with the special symbol as discussed above, i.e.:

- the special symbol itself is assigned a multiplier of 3.5×;
- the two ordinary symbols adjacent the special symbol are changed to enhanced symbols by assigning a multiplier of 2.5×;
- the two ordinary symbols separated from the special symbol by one ordinary symbol are changed to enhanced symbols by assigning a multiplier of 1.5×; and
- the two ordinary symbols separated from the special symbol by two ordinary symbols are changed to enhanced symbols by assigning a multiplier of 1.2×).

If that same activation event occurs again before that special symbol has been deactivated the game controller 101 may be configured to "stack" the multipliers of the special symbol and ordinary symbols satisfying the proximity criteria together, for example

- the multiplier assigned to the special symbol itself is set to 7.0× (3.5×+3.5×);
- the multiplier assigned to the two enhanced symbols adjacent the special symbol is set to 5.0× (2.5×+2.5×);
- the multiplier assigned to the two enhanced symbols separated from the special symbol by one symbol is set to 3.0× (1.5×+1.5×); and
- the multiplier assigned to the two enhanced symbols separated from the special symbol by two symbols is set to 2.4× (1.2×+1.2×)

Game Process

Figure 10:
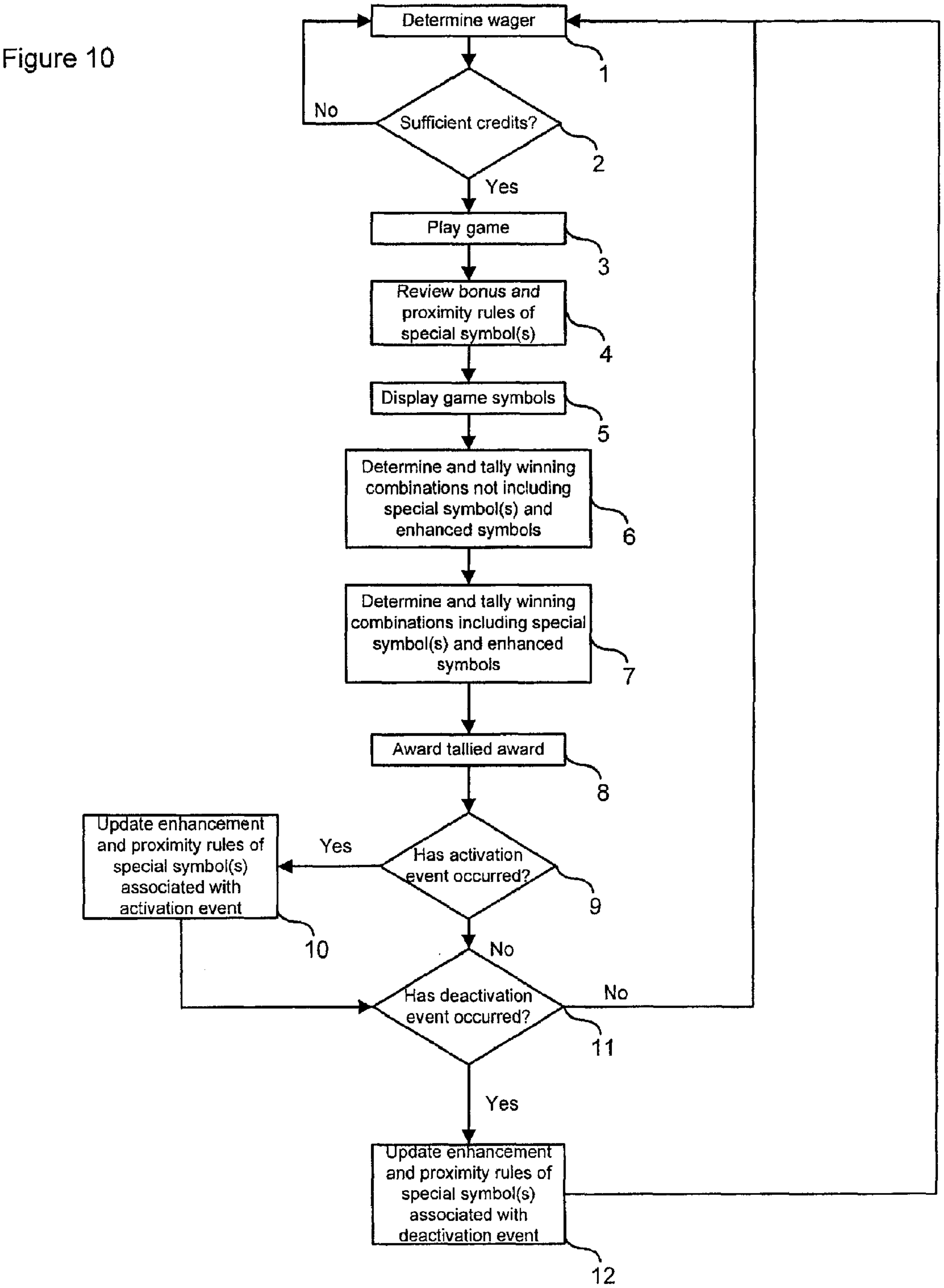
FIG. 10: shows a flow diagram of a process performed in accordance with an embodiment of the present invention.

FIG. 10 shows a process flow diagram of a process performed in accordance with an embodiment of the present invention. The process may be performed by the gaming system 200, in which the gaming consoles 114 each include game controllers 101 to form gaming machines 100 and the following description assumes this implementation. However, those skilled in the relevant arts will appreciate that the process will also be able to be implemented by other gaming systems.

In step 1, the game controller 101 monitors the bill acceptor and/or coin input 110 and/or information received by the card/ticket reader 108 or network card 112 for a deposit of credit and in response causes the hardware meters 104 to increment according to the denomination of the game. The game controller 101 then monitors the user interface 107 for the input of a wager.

In step 2 the game controller 101 determines whether there are sufficient credits to support the wager and if sufficient credits are available a game play is commenced in step 3.

In step 4 the game controller 101 reviews the enhancement and proximity rules associated with any special symbols in the set of game symbols. From this information the game controller 101 determines which (if any) special symbols are activated and the enhancement and proximity rules associated with those symbols. The game controller 101 also determines which game symbols (if any) are enhanced game symbols and need to be displayed as such to alert the user to an activated special symbol and the effects thereof.

In step 5 the game controller 101 displays the game symbols to the user.

In step 6 the game controller 101 determines and tallies any winning combinations from the displayed symbols that do not include activated special symbols or enhanced symbols affected by the enhancement and proximity rules of an activated special symbol.

In step 7 the game controller 101 determines and tallies any winning combinations from the displayed symbols which include activated special symbols and/or enhanced symbols affected by the enhancement and proximity rules of an activated special symbol.

In step 8 the game controller 101 awards the award tallied from both steps 6 and 7 to the player.

In step 9 the game controller 101 checks to see whether any activation event has occurred, and if so in step 10 updates the enhancement and proximity rules of the special symbol (or special symbols) to which that activation event relates.

In step 11 the game controller 101 checks to see whether any deactivation event has occurred, and if so in step 12 updates the enhancement and proximity rules of the special symbol (or special symbols) to which that deactivation event relates.

It will be appreciated that the above is one of many possible processed by which the features of embodiments of the invention may be realised.

While the foregoing description has been provided by way of example of certain embodiments of the present invention as presently contemplated, which utilise gaming machines of the type found in casinos, those skilled in the relevant arts will appreciate that certain embodiments of the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "includes" (or its grammatical variants) as used in this specification is equivalent to the term "includes" and should not be taken as excluding the presence of other elements or features.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. As noted above, certain embodiments of the present invention may be implemented using an existing computer processor and/or by a special purpose computer processor incorporated for this or another purpose or by a hardwired system, for example.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A gaming machine that provides a game, the gaming machine including:

a plurality of reels having a plurality of symbol positions, each of the plurality of symbol positions populated with game symbols selected from a set of game symbols including ordinary game symbols and at least one special symbol, wherein the gaming machine is configured to award an award when a winning combination of game symbols is selected for display;

a user interface; and a game controller in communication with the user interface, the game controller configured to enhance characteristics of at least one of the ordinary game symbols when a special symbol of the at least one special symbols in the same reel has been activated in response to an activation event other than selection of the special symbol for display to create at least one enhanced symbol having at least one enhancement selected from a set of enhancements based upon a number of intervening game symbols between the at least one ordinary game symbol and the special symbol.

2. A gaming machine according to claim 1, wherein the set of enhancements is a set of multiplier values, and the enhanced symbol is created by assigning a multiplier value of the set of multiplier values to an ordinary game symbol of the at least one ordinary game symbol, the multiplier value being applicable to an award associated with a winning combination which includes the enhanced symbol to which the multiplier has been assigned.

3. A gaming machine according to claim 1, wherein the set of enhancements includes a set of ordinary game symbols, and the enhanced symbol is created by making an ordinary game symbol of the at least one ordinary game symbols substitutable for one or more ordinary game symbols of the set of ordinary game symbols for the purposes of determining a winning combination.

4. A gaming machine according to claim 1, wherein the game controller is configured to enhance the characteristics of the special symbol itself.

5. A gaming machine according to claim 1, wherein on activation of the special symbol, the game controller is configured to enhance the characteristics of a plurality of ordinary game symbols to create a plurality of enhanced symbols.

6. A gaming machine according to claim 2, wherein the multiplier value assigned to the enhanced symbol is dependent on the number of intervening game symbols between the enhanced symbol and the special symbol.

7. A gaming machine according to claim 6, wherein a multiplier value selected from the set of multiplier values for ordinary symbols having one intervening game symbol is less than a multiplier value selected from the set of multiplier values for ordinary symbols having no intervening game symbols.

8. A gaming machine according to claim 3, wherein at least one of a number and a type of ordinary game symbols within the set of ordinary game symbols is based on the number of intervening game symbols between the at least one ordinary game symbol and the special symbol.

9. A gaming machine according to claim 8, wherein a number of ordinary game symbols within the set of ordinary game symbols for ordinary game symbols having no intervening game symbols is greater than a number of ordinary game symbols within the set of ordinary game symbols for ordinary game symbols having one intervening game symbol.

10. A gaming machine according to claim 1 further including at least one indicator for indicating an activation of a special symbol and at least one of the existence and location of any enhanced symbols.

11. A gaming machine according to claim 1, wherein different activation events will result in different characteristics being assigned to at least one of the special symbol and the at least one enhanced symbol.

12. A gaming machine according to claim 1, wherein the special symbol may substitute as one or more ordinary symbols for the determination of a winning combination.

13. A gaming machine according to claim 1, wherein a special symbol activated by the activation event will remain activated until the occurrence of a deactivation event.

14. A gaming machine according to claim 1, wherein the activation event is an ante-bet feature, in which a player is given the option of purchasing the activated special symbol.

15. A method for use with a gaming machine, the method including:

selecting a set of game symbols for play of a game, the set of game symbols including ordinary game symbols and at least one special symbol;

displaying a plurality of symbol positioned arranged on a plurality of reels, each of the plurality of symbol positions populated with a game symbol selected from the set of game symbols;

enhancing the characteristics of at least one of the ordinary game symbols when a special symbol of the at least one special symbol in the same reel has been activated in response to an activation event other than selection of the special symbol for display to create at least one enhanced symbol having at least one enhancement selected from a set of enhancements based upon a number of intervening game symbols between the at least one ordinary game symbol and the special symbol; and awarding an award when a winning outcome of game symbols occurs.

16. A method according to claim 15, wherein the set of enhancements is a set of multiplier values, and the enhanced symbol is created by assigning a multiplier value of the set of multiplier values to an ordinary game symbol of the at least one ordinary game symbol, the multiplier value applicable to an award associated with a winning combination that includes the enhanced symbol to which the multiplier has been assigned.

17. A method according to claim 15, wherein the set of enhancements includes a set of ordinary game symbols, and the enhanced symbol is created by making an ordinary game symbol of the at least one ordinary game symbols substitutable for one or more ordinary game symbols of the set of ordinary game symbols for the purposes of determining a winning combination.

18. A method according to claim 15, further including enhancing the characteristics of the special symbol itself.

19. A method according to claim 15, wherein on activation of the special symbol the characteristics of a plurality of ordinary game symbols are enhanced to create a plurality of enhanced symbols.

20. A method according to claim 15, wherein the multiplier value assigned to the enhanced symbol is dependent on the number of intervening game symbols between the enhanced symbol and the special symbol.

21. A method according to claim 20, wherein a multiplier value selected from the set of multiplier values for ordinary symbols having one intervening game symbol is less than a multiplier value selected from the set of multiplier values for ordinary symbols having no intervening game symbols.

22. A method according to claim 17, wherein at least one of a number and a type of ordinary game symbols within the set of ordinary game symbols is based on the number of intervening game symbols between the at least one ordinary game symbol and the special symbol.

23. A method according to claim 22, wherein a number of ordinary game symbols within the set of ordinary game symbols for ordinary game symbols having no intervening game symbols is greater than a number of ordinary game symbols within the set of ordinary game symbols for ordinary game symbols having one intervening game symbol.

24. A method according to claim 15, further including indicating an activation of a special symbol and at least one of the existence and location of any enhanced symbols.

25. A method according to claim 15, wherein the special symbol may substitute as one or more ordinary symbols for the determination of a winning outcome.

26. A method according to claim 15, wherein a special symbol activated by an activation event will remain activated until the occurrence of a deactivation event.

27. A method according to claim 15, wherein the activation event is an ante-bet feature, in which a player is given the option of purchasing the activated special symbol.

28. A gaming system including at least one gaming machine configured to provide a game, the at least one gaming machine including:

a plurality of reels having a plurality of symbol positions, each of the plurality of symbol positions populated with game symbols selected from a set of game symbols including ordinary game symbols and at least one special symbol, wherein the gaming machine is configured to award an award when a winning combination of game symbols is selected for display;

a user interface;

a game controller in communication with the user interface, the game controller configured to enhance characteristics of at least one of the ordinary game symbols when a special symbol of the at least one special symbols in the same reel has been activated in response to an activation event other than selection of the special symbol for display to create at least one enhanced symbol having at least one enhancement selected from a set of enhancements based upon a number of intervening game symbols between the at least one ordinary game symbol and the special symbol.

29. A storage medium readable by a game controller and storing instructions executable by a game controller to implement a method for use with a gaming machine, the method including:

selecting a set of game symbols for play of a game, the set of game symbols including ordinary game symbols and at least one special symbol;

displaying a plurality of symbol positioned arranged on a plurality of reels, each of the plurality of symbol positions populated with a game symbol selected from the set of game symbols;

enhancing the characteristics of at least one of the ordinary game symbols when a special symbol of the at least one special symbol in the same reel has been activated in response to an activation event other than selection of the special symbol for display to create at least one enhanced symbol having at least one enhancement selected from a set of enhancements based upon a number of intervening game symbols between the at least one ordinary game symbol and the special symbol; and awarding an award when a winning outcome of game symbols occurs.

* * * * *